(12) United States Patent
Akiyama et al.

(10) Patent No.: US 11,833,883 B1
(45) Date of Patent: Dec. 5, 2023

(54) COOLING FAN DEVICE

(71) Applicant: TOYOTA JIDOSHA KABUSHIKI KAISHA, Toyota (JP)

(72) Inventors: Shoichi Akiyama, Toyota (JP); Dai Okumura, Seto (JP); Atsushi Fukuda, Nisshin (JP); Daisuke Sakamoto, Miyoshi (JP); Hiromu Watanabe, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/337,431

(22) Filed: Jun. 20, 2023

(30) Foreign Application Priority Data

Jul. 22, 2022 (JP) .................. 2022-117026

(51) Int. Cl.
B60H 1/00 (2006.01)
F16D 48/02 (2006.01)
F01P 7/08 (2006.01)

(52) U.S. Cl.
CPC .......... B60H 1/00828 (2013.01); F01P 7/081 (2013.01); F16D 48/02 (2013.01); *F01P 7/088* (2013.01)

(58) Field of Classification Search
CPC ..... B60H 1/00828; F16D 48/02; F16D 48/06; F01P 7/081; F01P 7/84; F01P 7/082; F01P 7/088
See application file for complete search history.

(56) References Cited

U.S. PATENT DOCUMENTS

| 2004/0148953 | A1* | 8/2004 | Kurata | B60H 1/00735 62/324.1 |
| 2006/0096554 | A1* | 5/2006 | Shiozaki | F16D 48/064 123/41.12 |
| 2010/0242510 | A1* | 9/2010 | Kadle | B60H 1/3208 700/275 |
| 2021/0332825 | A1 | 10/2021 | Akiyama et al. | |

FOREIGN PATENT DOCUMENTS

| JP | 2007170236 A | 7/2007 |
| JP | 2021173382 A | 11/2021 |

* cited by examiner

Primary Examiner — Syed O Hasan

(57) ABSTRACT

A cooling fan device includes an electronic control unit that controls an engagement rate of a fan clutch. The electronic control unit executes a first calculation process that calculates an air conditioner requested engagement rate, a second calculation process that calculates, as a first guard value, a value of an engagement rate at which a fan rotation speed increases at a specified speed and an upper limit guarding process that sets a value of the air conditioner requested engagement rate to the first guard value when a calculated value of the air conditioner requested engagement rate in the first calculation process exceeds the first guard value. The electronic control unit further controls the engagement rate of the fan clutch based on a value of the air conditioner requested engagement rate after execution of the upper limit guarding process.

3 Claims, 1 Drawing Sheet

COOLING FAN DEVICE

BACKGROUND

1. Field

The present disclosure relates to a cooling fan device.

2. Description of Related Art

Japanese Laid-Open Patent Publication No. 2021-173382 discloses a cooling fan device that generates cooling air flow for a radiator, which cools engine coolant. The disclosed device performs electronic control of a cooling fan based on parameters such as a vehicle speed, a temperature of the engine coolant, and a target temperature of an air conditioner.

In the above-described cooling fan device, when the cooling fan is controlled so as to satisfy the cooling request of the engine or the request of the air conditioner, the rotation speed of the cooling fan increases, for example, at the time of acceleration of the vehicle, and the fan noise, which is the operation noise of the cooling fan may rapidly increase. When the fan noise rapidly increases, an occupant may feel disturbed and the drivability may deteriorate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a cooling fan device is configured to use a cooling fan coupled to an engine via a fan clutch to generate cooling air flow for a condenser for cooling an air conditioner refrigerant. The cooling fan device includes an electronic control unit configured to control an engagement rate of the fan clutch. The electronic control unit being configured to execute a first calculation process, a second calculation process, and an upper limit guarding process. The first calculation process calculates an air conditioner requested engagement rate. The air conditioner requested engagement rate is a requested rate of the engagement rate in accordance with a cooling request for the air conditioner refrigerant. The second calculation process calculates, as a first guard value, a value of the engagement rate at which a rotation speed of the cooling fan increases at a specified speed. The upper limit guarding process sets a value of the air conditioner requested engagement rate to the first guard value when a calculated value of the air conditioner requested engagement rate in the first calculation process exceeds the first guard value. The electronic control unit is further configured to control the engagement rate based on a value of the air conditioner requested engagement rate after execution of the upper limit guarding process.

In the cooling fan device described above, the value of the air conditioner requested engagement rate is set such that the rotation speed of the cooling fan is less than or equal to a specified speed. Therefore, even when the cooling request for the air conditioner refrigerant is suddenly increased, the rotation speed of the cooling fan is unlikely to increase suddenly. Thus, a rapid increase in the fan noise due to a rapid increase in the rotation speed of the cooling fan is avoided. Therefore, the cooling fan device prevents fan noise from increasing rapidly.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
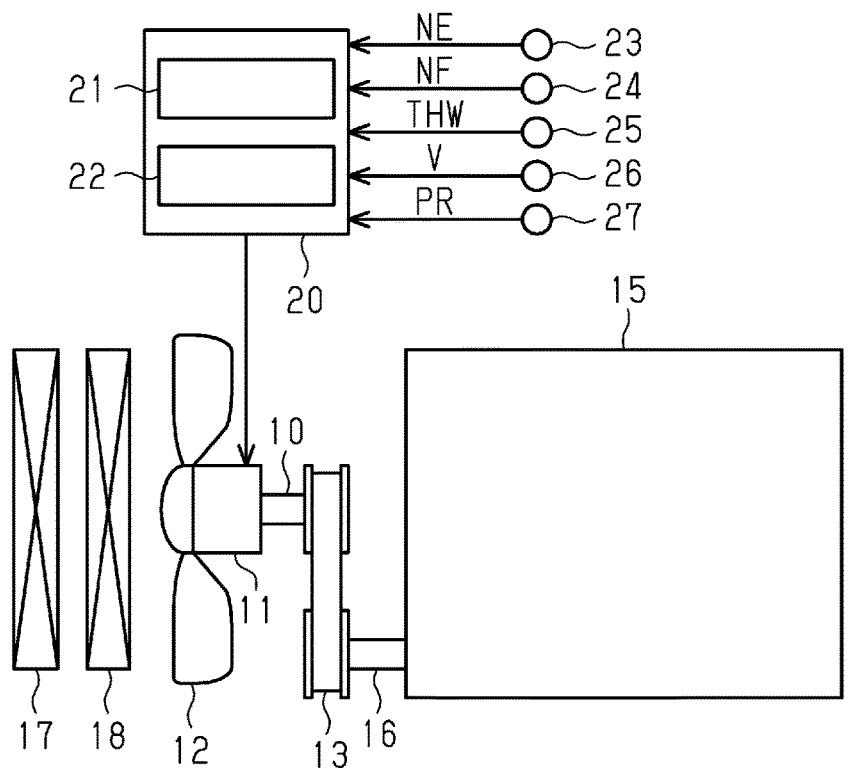
FIG. 1 is a diagram schematically showing a configuration of a cooling fan device according to an embodiment.

Hereinafter, a cooling fan according to an embodiment will be described in detail with reference to FIGS. 1 and 2.

<Configuration of Cooling Fan Device>

First, the configuration of the cooling fan device according to the present embodiment will be described with reference to FIG. 1. The cooling fan device of the present embodiment is installed in an engine room of a vehicle. The cooling fan device includes a rotation input shaft 10, a fan clutch 11, and a cooling fan 12. The rotation input shaft 10 is coupled to a crankshaft 16 of an engine 15 via a wrapping transmission mechanism 13. The cooling fan 12 generates cooling air flow for the radiator 17 and the condenser 18 in accordance with rotation. The radiator 17 is a heat exchanger for cooling engine coolant. The condenser 18 is a heat exchanger for cooling the air conditioner refrigerant. The fan clutch 11 is interposed between the rotation input shaft 10 and the cooling fan 12. The fan clutch 11 is a fluid clutch that uses a viscous fluid such as silicone oil as a rotational torque transmission media. The fan clutch 11 is configured to change the engagement rate between the rotation input shaft 10 and the cooling fan 12 by adjusting the amount of the viscous fluid in the working chamber. The details of the fan clutch 11 are described in, for example, Japanese Laid-Open Patent Publication No. 2021-173382.

The cooling fan device includes an electronic control unit 20. The electronic control unit 20 has a ROM 21 and a CPU 22. The ROM 21 is a storage device that stores programs and data for controlling the fan clutch 11. The CPU 22 is a processing device that reads and executes a program stored in the ROM 21. A first rotation speed sensor 23, a second rotation speed sensor 24, a coolant temperature sensor 25, a vehicle speed sensor 26, and a refrigerant pressure sensor 27 are connected to the electronic control unit 20. The first rotation speed sensor 23 is a sensor that detects an engine rotation speed NE that is a rotation speed of the crankshaft 16 of the engine 15. The second rotation speed sensor 24 is a sensor that detects a fan rotation speed NF that is a rotation speed of the cooling fan 12. The coolant temperature sensor 25 is a sensor that detects an engine coolant temperature THW, which is the temperature of the engine coolant. The vehicle speed sensor 26 is a sensor that detects a vehicle speed V. The refrigerant pressure sensor 27 is a sensor that detects a refrigerant pressure PR that is the pressure of the air conditioner refrigerant sent to the condenser 18.

The rotation input shaft 10 of the cooling fan apparatus configured as described above rotates at a speed proportional to the engine rotation speed NE. The rotation of the rotation input shaft 10 is transmitted to the cooling fan 12 via the fan clutch 11. In the following description, the rotation speed of the rotation input shaft 10 is referred to as an input rotation speed NI. The electronic control unit 20 calculates the input rotation speed NI based on the detection result of the first rotation speed sensor 23.

The electronic control unit 20 controls a fan engagement rate FN, which is an engagement rate between the rotation input shaft 10 and the cooling fan 12, through operation of the fan clutch 11. Here, the ratio of the fan rotation speed NF to the input rotation speed NI is used as the value of the fan engagement rate FN. When the value of the fan engagement rate FN is 0, the fan rotation speed NF is 0. When the value of the fan engagement rate FN is 1, the fan rotation speed NF is equal to the input rotation speed NI.

<Cooling Fan Control>

Next, cooling fan control executed by the electronic control unit 20 will be described with reference to FIG. 2. In the cooling fan control, the electronic control unit 20 sets a target engagement rate FN* which is a control target value of the fan engagement rate FN. Then, the electronic control unit 20 operates the fan clutch 11 so that the fan engagement rate FN becomes equal to the target engagement rate FN*. The fan clutch 11 is operated by open control or feedback control.

Figure 2:
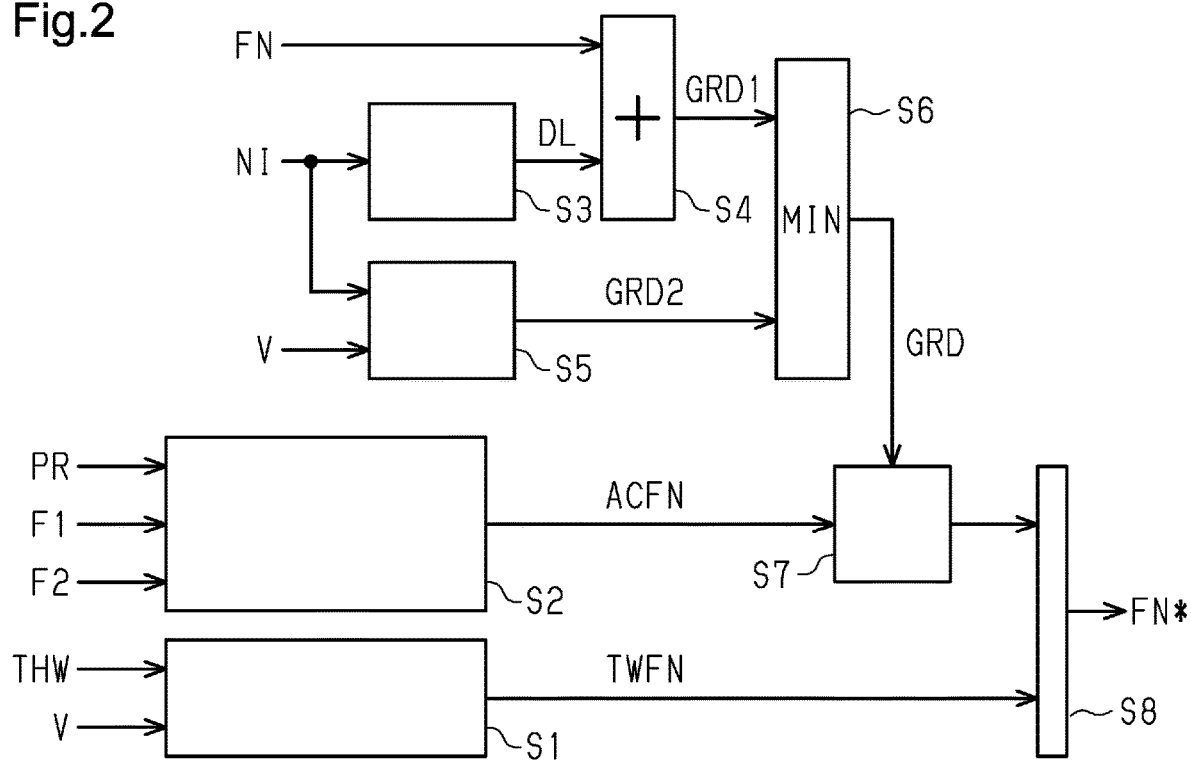
FIG. 2 is a control flow diagram showing a flow of processes related to control of a fan engagement rate executed by an electronic control unit of the cooling fan device.

FIG. 2 shows a flow of processing of the electronic control unit 20 related to setting of the target engagement rate FN*. The electronic control unit 20 repeatedly sets the target engagement rate FN* at predetermined control intervals.

When setting the target engagement rate FN*, the electronic control unit 20 calculates a coolant temperature requested engagement rate TWFN based on parameters such as the engine coolant temperature THW and the vehicle speed V (process S1). The coolant temperature requested engagement rate TWFN is a requested value of the fan engagement rate FN corresponding to the cooling request for the engine coolant. The electronic control unit 20 calculates, as the value of the coolant temperature requested engagement rate TWFN, a value of the fan engagement rate FN that allows the amount of air flow to the radiator 17 to be sufficient to maintain the engine coolant temperature THW at an appropriate temperature in a case in which the vehicle is in a steady traveling state. The steady traveling state means a state in which the vehicle travels on a flat ground at a substantially constant vehicle speed V.

The electronic control unit 20 calculates the value of the air conditioner requested engagement rate ACFN based on the refrigerant pressure PR, the running flag F1, and the air conditioner operation flag F2 (process S2). The air conditioner requested engagement rate ACFN is a requested value of the fan engagement rate FN corresponding to the cooling request for the air conditioner refrigerant. The running flag F1 is a flag indicating whether or not the vehicle is traveling. The air conditioner operation flag F2 is a flag indicating whether or not the air conditioner is in operation. Here, the operation of the air conditioner refers to a state in which air conditioning in the vehicle using a cooling cycle of an air conditioner refrigerant, that is, cooling or dehumidification is performed.

The electronic control unit 20 sets the value of the air conditioner requested engagement rate ACFN to 0 when the air conditioner operation flag F2 is off, i.e., when the air conditioner is not in operation. When the air conditioner operation flag F2 is ON, i.e., when the air conditioner is in operation, the electronic control unit 20 calculates the following value as the value of the air conditioner requested engagement rate ACFN. That is, this value is the value of the fan engagement rate FN at which the amount of air flow to the condenser 18 satisfies the cooling request for the air conditioner refrigerant when the vehicle is traveling in a steady state. The cooling air flow generated by the cooling fan 12 and the relative wind impinge on the condenser 18. The relative wind increases as the vehicle speed V increases. As the refrigerant pressure PR increases, a larger amount of air flow is required to cool the air conditioner refrigerant. Therefore, the electronic control unit 20 sets the value of the air conditioner requested engagement rate ACFN such that the air conditioner requested engagement rate ACFN becomes larger when the vehicle speed V is relatively low than when the vehicle speed V is relatively high, and becomes larger when the refrigerant pressure PR is relatively high than when the refrigerant pressure PR is relatively low.

On the other hand, the electronic control unit 20 calculates the value of the increase amount DL based on the input rotation speed NI (process S3). The increase amount DL represents an increase amount of the fan engagement rate FN required to increase the fan rotation speed NF from the current value by a specified value. Then, the electronic control unit 20 calculates a value obtained by adding the increase amount DL to the current fan engagement rate FN as a first guard value GRD1 (process S4). The first guard value GRD1 thus calculated represents a value of the fan engagement rate FN at which the rotation speed of the cooling fan 12 increases at a specified speed.

The electronic control unit 20 calculates a second guard value GRD2 based on the input rotation speed NI and the vehicle speed V (process S5). The electronic control unit 20 calculates, as a second guard value GRD2, a maximum value of the fan engagement rate FN at which the fan noise remains at an allowable level. When background noise such as road noise and wind noise is small, even if the fan noise is not so loud, occupants are likely to feel the fan noise as annoying. The background noise increases as the vehicle speed V increases. On the other hand, the fan noise increases as the fan rotation speed NF increases. Therefore, the upper limit value of the fan rotation speed NF at which the fan noise remains at an allowable level increases as the vehicle speed V increases. The fan rotation speed NF is determined by the input rotation speed NI and the fan engagement rate FN. Therefore, the maximum value of the fan engagement rate FN at which the fan noise remains at an allowable level is a value obtained based on the input rotation speed NI and the vehicle speed V.

Further, the electronic control unit 20 sets the upper limit guard value GRD to the smaller one of the first guard value GRD1 and the second guard value GRD2 (process S6).

Then, the electronic control unit 20 performs the upper limit guard of the air conditioner requested engagement rate ACFN by the upper limit guard value GRD (process S7). That is, when the value of the air conditioner requested engagement rate ACFN calculated in the process S2 is less than or equal to the upper limit guard value GRD, the electronic control unit 20 maintains the value of the air conditioner requested engagement rate ACFN. On the other hand, when the value of the air conditioner requested engagement rate ACFN calculated in the process S2 exceeds the upper limit guard value GRD, the electronic control unit 20 resets the value of the air conditioner requested engagement rate ACFN to the upper limit guard value GRD. In the following description, the value of the air conditioner requested engagement rate ACFN after the process S7 is referred to as a guarding process value of the air conditioner requested engagement rate ACFN.

Finally, the electronic control unit 20 sets the value of the target engagement rate FN* based on the coolant temperature requested engagement rate TWFN and the guarding process value of the air conditioner requested engagement rate ACFN (process S8). For example, the electronic control unit 20 sets the value of the target engagement rate FN* to the larger one of the coolant temperature requested engagement rate TWFN and the guarding process value of the air conditioner requested engagement rate ACFN.

<Operation and Advantages of Embodiment>

The operation and advantages of the cooling fan device according to the present embodiment, which is configured in the above-described manner, will now be described.

In the process S2 of FIG. 2, the electronic control unit 20 calculates an air conditioner requested engagement rate ACFN, which is a requested rate of the engagement rate of the fan clutch 11 in response to the cooling request for the air conditioner refrigerant. In the processes S3 and S4 of FIG. 2, the electronic control unit 20 calculates the value of the fan engagement rate FN at which the fan rotation speed NF increases at a specified speed as the first guard value GRD1. More specifically, the electronic control unit 20 calculates an increase amount DL of the fan engagement rate FN required to increase the fan rotation speed NF by a predetermined value in the process S3 of FIG. 2. Then, the electronic control unit 20 calculates the first guard value GRD1 by adding the increase amount DL to the present value of the fan engagement rate FN.

Further, in the process S5 of FIG. 2, the electronic control unit 20 calculates the second guard value GRD2 based on the vehicle speed V such that the second guard value GRD2 is smaller when the vehicle speed V is relatively low than when the vehicle speed V is relatively high. In addition, in the processes S6 and S7 in FIG. 2, when the calculated value of the air conditioner requested engagement rate ACFN in the process S2 exceeds the first guard value GRD1, the electronic control unit 20 sets the value of the air conditioner requested engagement rate ACFN to the first guard value GRD1. Further, in the processes S6 and S7 of FIG. 2, the electronic control unit 20 sets the value of the air conditioner requested engagement rate ACFN to the second guard value GRD2 in the following case: The second guard value GRD2 is smaller than the first guard value GRD1, and the calculated value of the air conditioner requested engagement rate ACFN in the process S2 exceeds the second guard value GRD2. In the present embodiment, the process S2 in FIG. 2 corresponds to a first calculation process, the processes S3 and S4 correspond to a second calculation process, and the process S5 corresponds to a third calculation process. In the present embodiment, the processes S6 and S7 in FIG. 2 correspond to an upper limit guarding process.

The electronic control unit 20 controls the fan engagement rate FN of the fan clutch 11 in response to a cooling request for the engine coolant and a cooling request for the air conditioner refrigerant. The degree of the request for cooling the air conditioner refrigerant may suddenly change in response to turning on/off of the air conditioner or a change in the set temperature. For this reason, the air conditioner requested engagement rate ACFN may rapidly increase and the fan rotation speed NF may rapidly increase. When the fan rotation speed NF rapidly increases, there is a possibility that the fan noise suddenly increases and the occupant feels uncomfortable. In this embodiment, the cooling fan device is controlled using the fan engagement rate FN as a control amount. For example, when the engine rotation speed NE increases due to acceleration of the vehicle, the fan rotation speed NF increases even if the fan engagement rate FN is constant. Therefore, when the air conditioner requested engagement rate ACFN increases during acceleration, the increase in the fan rotation speed NF is accelerated, and thus the fan noise is likely to rapidly increase.

In this regard, the electronic control unit 20 calculates, as the first guard value GRD1, a value of the fan engagement rate FN at which the fan rotation speed NF increases at a specified speed. The upper limit value of the air conditioner requested engagement rate ACFN is determined so as to be less than or equal to the first guard value GRD1. Accordingly, a rapid increase in fan rotation speed NF exceeding the specified speed is limited, and thus fan noise is less likely to increase rapidly.

According to the cooling fan device of the present embodiment, the following effects can be obtained.

(1) The fan rotation speed NF is less likely to increase rapidly even when the cooling request for the air conditioner refrigerant increases rapidly. Therefore, the fan noise is less likely to increase rapidly. Then, deterioration of drivability due to rapid increase of fan noise is suppressed.

(2) The electronic control unit 20 calculates, based on the input rotation speed NI, the increase amount DL of the fan engagement rate FN by which the fan rotation speed NF increases by a predetermined value. Then, the electronic control unit 20 calculates the first guard value GRD1 by adding the increase amount DL to the current value of the fan engagement rate FN. Therefore, it is possible to appropriately calculate the first guard value GRD1 such that the fan rotation speed NF becomes the value of the fan engagement rate FN that increases at the specified speed.

(3) The electronic control unit 20 calculates the second guard value GRD2 based on the vehicle speed V such that the second guard value GRD2 is smaller when the vehicle speed V is relatively low than when the vehicle speed V is relatively high. Also, the electronic control unit 20 sets the upper limit value of the air conditioner requested engagement rate ACFN to a value less than or equal to the second guard value GRD2. Therefore, it is possible to limit the fan noise in accordance with a change in the background noise due to the vehicle speed V so that the fan noise has a magnitude that is not recognized as noise by the occupant.

OTHER EMBODIMENTS

The present embodiment may be modified as follows. The present embodiment and the following modifications can be combined as long as the combined modifications remain technically consistent with each other.

In the above-described embodiment, in the process S8 of FIG. 2, the value of the target engagement rate FN* is set to the larger value of the coolant temperature requested engagement rate TWFN and the air conditioner requested engagement rate ACFN. Alternatively, the value of the target engagement rate FN* may be set in a different manner. For example, the value of the target engagement rate FN* may be set to a mean value or a weighted mean value of the coolant temperature requested engagement rate TWFN and the air conditioner requested engagement rate ACFN.

In the process S5 of FIG. 2, the second guard value GRD2 may be calculated based on the vehicle speed V without using the input rotation speed NI. For example, during steady traveling of the vehicle, the engine rotation speed NE for each vehicle speed V falls within a certain range. Therefore, if the second guard value GRD2 is set to a smaller value when the vehicle speed V is relatively low than when the vehicle speed V is relatively high, the fan noise during steady traveling can be limited to a magnitude that does not become noise in accordance with the background noise.

The processes S5 and S6 in FIG. 2 may be omitted, and the upper limit guard value GRD may be set to the first guard value GRD1 as it is to perform the process S7. That is, the third calculation process may be omitted, and the upper limit guarding process may be performed based only on the first guard value GRD1 calculated in the second calculation process.

In the embodiment described above, the increase amount DL is calculated based on the input rotation speed NI, and the first guard value GRD1 is calculated by adding the increase amount DL to the current value of the fan engagement rate FN. The first guard value GRD1 may be directly calculated based on the input rotation speed NI or the like without calculating the increase amount DL.

The target engagement rate FN* may be calculated as a value corresponding to a request other than the request for cooling the engine coolant and the air conditioner coolant, for example, a request for protection of a component of the cooling fan device. For example, a process of calculating a request value of the fan engagement rate FN according to another request may be added to the series of processes in FIG. 2, and the setting of the target engagement rate FN* in the process S8 may be performed based on the request value.

When the cooling fan device is configured to cool only the condenser 18 without cooling the radiators 17, the value of the air conditioner requested engagement rate ACFN after the upper limit guarding process may be directly set as the value of the target engagement rate FN*.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A cooling fan device configured to use a cooling fan coupled to an engine via a fan clutch to generate cooling air flow for a condenser for cooling an air conditioner refrigerant, the cooling fan device comprising:
   an electronic control unit configured to control an engagement rate of the fan clutch, the electronic control unit being configured to execute:
      a first calculation process that calculates an air conditioner requested engagement rate, the air conditioner requested engagement rate being a requested rate of the engagement rate in accordance with a cooling request for the air conditioner refrigerant;
      a second calculation process that calculates, as a first guard value, a value of the engagement rate at which a rotation speed of the cooling fan increases at a specified speed; and
      an upper limit guarding process that sets a value of the air conditioner requested engagement rate to the first guard value when a calculated value of the air conditioner requested engagement rate in the first calculation process exceeds the first guard value, and
   the electronic control unit is further configured to control the engagement rate based on a value of the air conditioner requested engagement rate after execution of the upper limit guarding process.

2. The cooling fan device according to claim 1, wherein the second calculation process includes:
   calculating an increase amount of the engagement rate required to increase the rotation speed of the cooling fan by a specified value; and
   calculating, as the first guard value, a value obtained by adding the increase amount to a current value of the engagement rate.

3. The cooling fan device according to claim 1, wherein the electronic control unit is configured to further execute a third calculation process that calculates a second guard value based on a vehicle speed such that the second guard value is smaller when the vehicle speed is low than when the vehicle speed is high, and
   the upper limit guarding process includes setting the value of the air conditioner requested engagement rate to the second guard value when the second guard value is smaller than the first guard value and the calculated value of the air conditioner requested engagement rate in the first calculation process exceeds the second guard value.

* * * * *